(12) United States Patent
Imori

(10) Patent No.: US 8,837,172 B2
(45) Date of Patent: Sep. 16, 2014

(54) CARRIER WAVE AMPLITUDE CONTROL IN POWER SOURCE FOR STABILIZING DC VOLTAGE BY UTILIZING FREQUENCY DEPENDENCE OF RESONANCE

(76) Inventor: Masatosi Imori, Bunkyo-ku (JP)

( * ) Notice: Subject to any disclaimer, the term of this patent is extended or adjusted under 35 U.S.C. 154(b) by 1185 days.

(21) Appl. No.: 12/674,905

(22) PCT Filed: Sep. 1, 2007

(86) PCT No.: PCT/JP2007/000947
§ 371 (c)(1),
(2), (4) Date: Apr. 7, 2011

(87) PCT Pub. No.: WO2009/028017
PCT Pub. Date: Mar. 5, 2009

(65) Prior Publication Data
US 2011/0176334 A1 Jul. 21, 2011

(51) Int. Cl.
*H02M 3/335* (2006.01)
*H02M 3/337* (2006.01)
*H02M 1/00* (2006.01)

(52) U.S. Cl.
CPC .... *H02M 3/3376* (2013.01); *H02M 2001/0058* (2013.01); *Y02B 70/1441* (2013.01)
USPC ...................................... 363/21.02

(58) Field of Classification Search
CPC ...................................... H02M 3/3376
USPC ............ 363/16, 17, 20, 21.01, 21.02, 97, 98, 363/131, 132
See application file for complete search history.

(56) References Cited

U.S. PATENT DOCUMENTS

| | | | | |
|---|---|---|---|---|
| 7,446,512 | B2 * | 11/2008 | Nishihara et al. | 323/233 |
| 7,796,406 | B2 * | 9/2010 | Lev | 363/21.02 |
| 8,130,515 | B2 * | 3/2012 | Shimada et al. | 363/17 |
| 8,363,427 | B2 * | 1/2013 | Anguelov et al. | 363/21.02 |

* cited by examiner

*Primary Examiner* — Matthew Nguyen

(57) ABSTRACT

In the power supply composed of a driver circuit generating the carrier, a resonance circuit driven by the carrier and a rectification circuit generating the dc voltage by rectifying the amplitude-modulated carrier supplied by the resonance circuit and stabilizing the output voltage by the feeding back the voltage error between the output voltage and a reference voltage externally supplied to set up the output voltage, to the frequency and the amplitude of the carrier, the frequency response of the dc power supply is improved both by providing the pole located at the origin with a transfer function where the dc voltage, generated by rectifying and smoothing the output of the resonance circuit, is fed back to the frequency of the carrier and by not providing the pole at the origin with a transfer function where the dc voltage is fed back to the amplitude of the carrier.

3 Claims, 7 Drawing Sheets

$R_{in} = 7.83\ \Omega,\quad R = 7.83\ \Omega\quad L = 20.4\ mH\quad C = 307\ pF$ $C_{d1} = 1.51\ nF\quad C_{d2} = 29\ nF\quad N = 3.5$

CARRIER WAVE AMPLITUDE CONTROL IN POWER SOURCE FOR STABILIZING DC VOLTAGE BY UTILIZING FREQUENCY DEPENDENCE OF RESONANCE

TECHNICAL FIELD

The present invention relates to stabilization of the output voltage of the power supply which generates direct-current output voltage using a resonance circuit.

BACKGROUND ART

A power supply using a piezoelectric transformer is such a power supply that generates voltage using a resonance circuit. The piezoelectric transformer is several times larger than that of the conventional magnetic transformer in power density and can be operated in such a range of high frequency where the conventional magnetic transformer shows large loss and becomes impractical. The piezoelectric transformer can be made several times smaller in size than that of the magnetic transformer of the same rating in power. The piezoelectric transformer depends mainly on load and frequency, showing charac-teristics different from the conventional magnetic transformer, which prevents practical usage of the piezoelectric transformer in a power supply.

Such a stabilized direct current (dc) voltage supply regulates its output voltage using frequency dependence of amplitude ratio. The amplitude ratio, defined by the volt-age ratio of the input to the output of the piezoelectric transformer, shows resonance characteristics against the frequency of the carrier. From a viewpoint of efficiency, the piezoelectric transformer is supplied with such the carrier that is higher in frequency than the resonance of the piezoelectric transformer. For example, the frequency of the carrier is lowered and moved to the resonance to increase the output voltage. Yet the fall of the frequency causes the drop of the output voltage which is generated by rectifying the output carrier of the transformer. Namely, to lower the frequency in order to increase the output voltage causes temporary drop of the output voltage.

In the case that the carrier is higher than the resonance in frequency in the voltage supply, the transfer function of the output voltage has a zero in the right half plane as the function of the carrier frequency. It is difficult to implement a large loop gain for the circuit whose transfer function has zeros in the right half plane because of a narrow range of parameters for stable operation. Furthermore, it is difficult to resolve the zeros in the right half plane by feedback because the circuit having poles in the right half plane is not stable.

[Patent Citation 1]
Japanese Examined Patent Application Publication No. 4053255
[Patent Citation 2]
Japanese Examined Patent Application Publication No. 4268013
[Patent Citation 3]
Japanese Unexamined Patent Application Publication No. 2007-330091
[Patent Citation 4]
Japanese Unexamined Patent Application Publication No. 2008-306775
[Patent Citation 5]
PCT/JP2007/000477 WO2007129468

The patent reference 1 makes it a subject to offer the simple circuit of the dc power supply providing the stabilized high voltage with sufficient efficiency. Efficiency is improved by using not a conventional electromagnetic transformer but a piezoelectric transformer. The high voltage is stabilized by using the frequency dependability of the resonance characteristics of a piezoelectric transformer. The piezoelectric transformer simplifies the circuit and reduces parts in number, by which the subject is solved.

The patent reference 2 realizes improvement of the output voltage both in the accuracy of stabilization and in the speed of response by implementing feedback of a little delay, together with a large delay where the output voltage is stabilized based on the frequency dependability of the resonance characteristic. The present invention is that an idea of feedback in the patent reference 2 is applied to the amplitude of the carrier.

The patent reference 3 concerns the stabilized dc voltage power supply where stabilization is based on the frequency dependence of the resonance, giving composition and constants of the feedback circuit stabilizing the dc output voltage which is supplied to the load of a wide range. The transfer function feeding the output voltage back to the frequency of the carrier driving the resonance circuit has a pole located at the origin.

The patent reference 4 concerns the stabilized dc voltage power supply where stabilization is based on the frequency dependence of the resonance, giving composition and constants of the feedback circuit stabilizing the dc output voltage that is supplied to the load of a wide range. The transfer function feeding the output voltage back to the frequency of the carrier that drives the resonance circuit is not provided with the pole located at the origin.

The patent reference 5 is the PCT application based on the patent references 3 and 4.

The patent reference 3, the patent reference 4 and the patent reference 5 are surveyed with relation to the present invention. These patent references are concerned with the stabilized dc power supply generating the voltage with a resonance circuit.

Equivalent Power Supply Approximating DC Power Supply

A power supply providing the stabilized dc output voltage consists of a voltage generation circuit and the feedback circuit. The voltage generation circuit is composed of a driver circuit, the resonance circuit, and the rectification circuit. The driver circuit generates a high-frequency alternating current carrier of locally constant amplitude. The carrier drives the resonance circuit. The feedback circuit consists of an error amplifier and a voltage controlled oscillator (VCO). The error amplifier compares the dc output voltage with the reference voltage supplied externally to set the output voltage. The VCO is enabled to control the frequency of the carrier generated by the driver circuit. The output voltage of the power supply, which is the output of the rectification circuit, is fed back to the frequency of the carrier through the feedback circuit so as to be stabilized.

An equivalent power supply was developed in the patent references 3, 4 and 5, where the equivalent power supply approximates the dc stabilized power supply and can be analyzed by mathematical methods. The equivalent power supply is schematically composed of a virtual voltage generation circuit and a feedback circuit. The virtual voltage generation circuit includes a driver circuit generating a carrier of locally fixed amplitude, a virtual resonance circuit driven by the carrier supplied by the driver circuit and a virtual rectification circuit generating dc voltage from the output of the resonance circuit. The output of the power supply is the output of the rectification circuit. The feedback circuit includes an error amplifier comparing the output voltage with the reference voltage supplied externally to set the output voltage and a voltage controlled oscillator (VCO) generating the frequency decided by the output of the error amplifier. The voltage controlled oscillator is enabled to control the frequency of the carrier generated by the driver circuit, and thus the output voltage is fed back to the frequency of the carrier so as to be stabilized.

The virtual voltage generation circuit consists of a driver circuit, a virtual resonance circuit, and a virtual rectification circuit. The resonance circuit converts the modulation of the carrier from the frequency modulation at the input to the amplitude modulation at the output. The virtual resonance circuit, supplied with the carrier of the frequency modulation as is the case with the resonance circuit, outputs the envelope of the carrier modulated in amplitude, being different from the resonance circuit. The virtual rectification circuit inputs the envelope, acts as a filter of first-order delay to the envelope and outputs an output equivalent to the output of the rectification circuit.

Operation of the equivalent power supply is described by a system of differential equations, stability of which can be analyzed mathematically. The system of differential equations is derived, and then the necessary conditions that the output voltage of the equivalent power supply is stable in the neighborhood of the reference voltage are shown. An actual circuit, which realizes stable feedback based on the necessary conditions, is shown with circuit constants given explicitly.

Frequency Modulation, Imaginary Resonance and Rectification Circuits

As for the resonance circuit whose transfer function given by h, letting $\omega_r$, Q, and $g_r$, be the angular velocity of the resonance frequency, the Q-value, and the amplitude ratio at the resonance frequency respectively of the resonance, then $\delta$, $\omega_0$, and c are defined by $$\delta = \frac{\omega_r}{2Q} \tag{1}$$

$$\omega_0 = \omega_r \sqrt{1 - \frac{1}{4Q^2}} \tag{2}$$

$$c = \frac{g_r \omega_r}{Q} \tag{3}$$

and the resonance circuit is driven by such a carrier of fixed amplitude modulated in frequency that is defined by $$\omega \exp(i\omega_0 t + i\psi)$$

where $\omega$ is the amplitude of the carrier and $\psi$ is a function of time representing a shift of phase, then $$\phi = \frac{d}{dt}\psi \tag{5}$$

then the frequency of the carrier given in expression 4 is $$\omega_0 + \phi$$

and, letting $r_r$ and $r_i$ be defined by $$r_r = \frac{1}{2}cw \tag{7}$$

$$r_i = \frac{\delta}{2\omega_0}cw \tag{8}$$

the resonance circuit, being driven by the carrier in expression 4, outputs the carrier the amplitude of which is given by p and q as $$\sqrt{p^2 + q^2}$$

where p and q satisfy $$\frac{d}{dt}p = q\phi - p\delta + r_r \tag{10}$$

$$\frac{d}{dt}q = -p\phi - q\delta + r_i \tag{11}$$

Then a first order delay which, letting the dc voltage generated by rectifying the carrier outputted by the resonance circuit be z, is represented by the following differential equation concerning z $$\mu\frac{d}{dt}z + z = \nu\sqrt{p^2 + q^2} \tag{12}$$

where $\mu$ and $\nu$ are a time constant and a multiplier at the rectification circuit respectively.

Feedback Circuit and System of Differential Equations

Letting k, d, E, A, and B be positive numbers and $\lambda$ be a reference voltage respectively, the dc voltage z in expression 12 from the rectification circuit is compared with the reference voltage $\lambda$. The voltage difference between z and $\lambda$ is fed back to the frequency of the carrier $\phi$ in expression 5, where the feedback is expressed on the assumption that $\phi > 0$ by the transfer function having a pole located at the origin as $$\phi = kd\frac{(E + As + Bs^2)}{s}(z - \lambda) \tag{13}$$

Then uniting expression 13, expressions 10, expression 11, and expression 12 makes the system of differential equations describing the power supply as $$\frac{d}{dt}p = q\phi - p\delta + r_r \tag{14}$$

$$\frac{d}{dt}q = -p\phi - q\delta + r_i \tag{15}$$

$$\frac{d}{dt}z = \frac{-z + \nu\sqrt{p^2 + q^2}}{\mu} \tag{16}$$

$$\frac{d}{dt}\phi = kEd(z - \lambda) + \frac{kAd\left(-z + \nu\sqrt{p^2 + q^2}\right)}{\mu} + kBd\left(-\frac{\sqrt{p^2 + q^2}(\nu + \nu\mu\delta)}{\mu^2} + \frac{z}{\mu^2} + \frac{\nu(qr_i + pr_r)}{\sqrt{p^2 + q^2}\mu}\right) \tag{17}$$

Stability and Overshoots

The stability of feedback in the stabilized dc power supply is attributed to the stability of the system of the differential equations given by expressions 14~17. The stability of the system is decided by the root of the characteristic polynomial derived from the system of the differential equations. That all the roots of the characteristic polynomial have negative real parts is the necessary and sufficient condition that the system of differential equations is stable in the sense of Lyapunov. It is the necessary condition to be satisfied by a power supply that the system of differential equations describing the power supply is stable in the sense of Lyapunov. Yet stability in the sense of Lyapunov is not enough for the stability of the power supply. For instance, there exist the cases where the power supply stable in the sense of Lyapunov oscillates the output voltage. There are also cases where the output voltage oscillates in the neighborhood of the voltage set by the reference voltage and cases where the oscillation decays in a long time.

There is operation of the power supply which the system of differential equations given by the expressions 14~17 does not approximate. The output voltage of the power supply is generated by the rectification circuit. The rectification circuit includes a capacitor, and the output voltage is buffered by the capacitor. As for the positive output voltage of the rectification circuit, pumping up the charge to the capacitor raises the output voltage, while it is impossible to pumping out the charge from the capacitor so as to lower the output voltage. Then the raise of the output voltage can be described by the system of the differential equations 14~17, while there are falls of the output voltage which the system of the differential equations cannot reproduce correctly.

While the output voltage is higher than the reference voltage, the feedback works to lower the output voltage, reducing the current supplied to the rectification circuit by the resonance circuit. In the case that the current is reduced to zero while the output voltage is higher than the reference voltage, the output voltage falls with a time constant of load resistance and the capacitor in the rectification circuit, where the fall is independent of the system of the differential equations. When the output voltage becomes lower than the reference voltage, the feedback begins to work, raising the output voltage. If the rise of the output voltage is accompanied by overshoots in voltage, the output voltage begins repeating the rise and the fall in voltage. Then it is necessary for stable feedback that the rise of the output voltage is free from the overshoot.

A Sufficient Condition

In the case that the characteristic polynomial has the real characteristic root separated from complex roots, the rise of the output voltage is not accompanied by the overshoot and then the feedback is stable. Let the transfer function feeding the output voltage back to the frequency of the carrier be given by $$\left(\frac{E}{s} + 1 + Bs\right) \times N \quad [18]$$

where N is a positive constant, then 1/E is an approximation of the time constant where the output voltage is raised. Letting E and B be assigned as $$E < \frac{1}{\mu} \quad [19]$$

and $$B \sim \frac{1}{\delta} \quad [20]$$

the bandwidth for feedback be restricted by the time constant 1/E, and N be assigned so that the loop gain becomes enough smaller than unity at the zero in the right half plane, then the feedback becomes stable.

Zeros in Right Half Plane

A zero in the right half plane is created, for example, by the resonance circuit driven by the carrier which is higher in frequency than the resonance frequency of the resonance circuit. In the stabilized dc power supply where the output voltage is generated by rectifying the output of the resonance circuit and stabilized by feeding the output voltage back to the frequency of the carrier supplied to the resonance circuit, the output voltage is lowered by increasing and raised by lowering the frequency of the carrier in the case that a frequency range of the carrier is selected to be higher than the resonance frequency of the resonance circuit as shown in FIG. 1. The fall of the frequency causes the drop of the output voltage. Namely, to lower the frequency in order to increase the output voltage causes temporary drop of the output voltage.

When the frequency of the carrier is lowered and moved to the resonance to raise the output voltage, the fall of the frequency causes immediate drop of the output voltage. The amplitude of the carrier outputted by the resonance circuit is changed after the frequency is shifted. The time delay from the shift of the frequency to the change of the amplitude is approximated by $1/\delta$. The amplitude of the temporary drop is dependent of magnitude of the load. The control which makes the output voltage increase accompanies the temporal drop of the output voltage, which is characteristic of the control system provided with zeros located at the right half plane.

DISCLOSURE OF INVENTION

Technical Problem

In the stabilized dc voltage power supply where the output voltage generated by rectifying the output of the resonance circuit is stabilized by frequency modulation of the carrier supplied to the resonance circuit, the feedback circuit and its constants improving the frequency response of the output voltage limited by a large delay caused by the feedback of the output voltage to the frequency of the carrier are given.

Technical Solution

Simultaneously implementing feedback of a large delay returning the output voltage to the frequency of the carrier and feedback of a small delay returning the output voltage to the amplitude of the carrier represses rapid frequency change of the carrier and improves the frequency response of the output voltage.

Variable Amplitude of Carrier

Letting ω+x be the amplitude of the carrier, where ω is a constant and x is a function of time, and ψ be a function of time, the carrier modulated in frequency is represented by

[21]

$$(\omega+x)\exp(i\omega_0 t+i\psi)$$

and φ is defined by ψ in expression 21 as $$\phi = \frac{d}{dt}\psi \quad [22]$$

then the frequency of the carrier in expression 21 with frequency modulation is given by $$\omega_0+\phi$$

Then $r_r$ and $r_i$ are modified from the definitions in expressions 7 and 8, and redefined by $$r_r = \frac{1}{2}c \quad [24]$$

$$r_i = \frac{\delta}{2\omega_0}c \quad [25]$$

The amplitude of the carrier supplied by the resonance circuit driven by the carrier shown in expression 21 is given by solutions of the following simultaneous equations $$\frac{d}{dt}p = q\phi - p\delta + r_r(w+x) \quad [26]$$

$$\frac{d}{dt}q = -p\phi - q\delta + r_i(w+x) \quad [27]$$

as $$\sqrt{p^2+q^2} \quad [28]$$

Let z be a dc voltage obtained by rectifying and smoothing the carrier supplied by the resonance circuit, then z satisfies the following equation $$\mu\frac{d}{dt}z + z = \nu\sqrt{p^2+q^2} \quad [29]$$

where μ is a time constant at smoothing and ν is a multiplier at the rectification.

Feedback of Output Voltage to Amplitude

Letting an error be voltage difference between z and λ where z is the output of the rectification circuit and λ is the reference voltage setting up the output voltage of the power supply, the error is fed back to amplitude w+x of the carrier by $$x = -G(z-\lambda)$$

where G is a positive constant. As is shown by expression 30, z being higher than the reference voltage makes x negative and works to lower output voltage z. Similarly, z higher than the reference voltage works to raise the output voltage.

Substituting expression 30 for the amplitude in expressions 26 and 27 gives $$\frac{d}{dt}p = \phi q - \delta p + (w - G(z-\lambda))r_r \quad [31]$$

$$\frac{d}{dt}q = -\phi p - \delta q + (w - G(z-\lambda))r_i \quad [32]$$

Feedback of Output Voltage to Frequency of Carrier

Letting an error be voltage difference between z and λ where z is the output of the rectification circuit and λ is the reference voltage setting up the output voltage of the power supply, the transfer function feeding the error back to the frequency of the carrier is shown with positive constants k, d, E, A, B and under the condition that $\phi \geq 0$ by $$\phi = kd\frac{(E + As + Bs^2)}{s}(z-\lambda) \quad [33]$$

where φ is defined in expression 22 and z is defined in expression 29.

Second Derivative of Output Voltage

Derivative of the output voltage z is given in expression 29, from which the second derivative of z relative to time t is obtained as follows.

$$\frac{d^2}{dt^2}z = \frac{1}{\mu}\left(-\frac{d}{dt}z + \frac{1}{2}\frac{\nu\left(2p\frac{d}{dt}p + 2q\frac{d}{dt}q\right)}{\sqrt{p^2+q^2}}\right) \quad [34]$$

Expressions 29, 31 and 32 transform expression 34 to $$\frac{d^2}{dt^2}z = \frac{\nu(w+x)(qr_i + r_rp)}{\mu\sqrt{p^2+q^2}} - \frac{\nu\sqrt{p^2+q^2} + \sqrt{p^2+q^2}\,\nu\mu\delta - z}{\mu^2} \quad [35]$$

Expression 35 is reduced with expression 30 to $$\frac{d^2}{dt^2}z = \frac{\nu(w - G(z-\lambda))(qr_i + r_rp)}{\mu\sqrt{p^2+q^2}} + \frac{-\nu\sqrt{p^2+q^2} - \sqrt{p^2+q^2}\,\nu\mu\delta + z}{\mu^2} \quad [36]$$

Transfer Function From Output Voltage to Frequency of Carrier

Expression 33 is rewritten to $$\frac{d}{dt}\phi = kd\left(E(z-\lambda) + A\frac{d}{dt}z + B\frac{d^2}{dt^2}z\right) \quad [37]$$

Substituting expression 29 for the first derivative of z and expression 36 for the second derivative gives the following expression.

$$\frac{d}{dt}\phi = kd\Bigg(E(z-\lambda) + \frac{A\left(-z + \nu\sqrt{p^2+q^2}\right)}{\mu} + B\Bigg(\frac{\nu(w - G(z-\lambda))(qr_i + r_rp)}{\mu\sqrt{p^2+q^2}} + \frac{-\nu\sqrt{p^2+q^2} - \sqrt{p^2+q^2}\,\nu\mu\delta + z}{\mu^2}\Bigg)\Bigg) \quad [38]$$

Description of Power Supply by Differential Equations

A regular system of differential equations composed of expressions 38, 31, 32, 29 describes the power supply where output voltage is fed back to the frequency and the amplitude of the carrier.

$$\frac{d}{dt}p = \phi q - \delta p + (w - G(z-\lambda))r_r \quad [39]$$

$$\frac{d}{dt}q = -\phi p - \delta q + (w - G(z-\lambda))r_i \quad [40]$$

$$\frac{d}{dt}z = \frac{-z + v\sqrt{p^2+q^2}}{\mu} \quad [41]$$

$$\frac{d}{dt}\phi = kd\bigg(E(z-\lambda) + \quad [42]$$
$$\frac{A(-z+v\sqrt{p^2+q^2})}{\mu} + B\bigg(\frac{v(w-G(z-\lambda))(qr_i + r_r p)}{\mu\sqrt{p^2+q^2}} +$$
$$\frac{-v\sqrt{p^2+q^2} - \sqrt{p^2+q^2}\,v\mu\delta + z}{\mu^2}\bigg)\bigg)$$

Equilibrium point of Differential Equation System

An equilibrium point of the regular system of the differential equations is defined by $$\frac{d}{dt}p = 0,\ \frac{d}{dt}q = 0,\ \frac{d}{dt}z = 0,\ \frac{d}{dt}\phi = 0 \quad [43]$$

The equilibrium point satisfies expressions 34 and 43

$$\frac{d^2}{dt^2}z = 0 \quad [44]$$

The equilibrium point is the simultaneous solutions of the following linear equations.

$$0 = \phi q - \delta p + (w - G(z-\lambda))r_r \quad [45]$$

$$0 = -\phi p - \delta q + (w - G(z-\lambda))r_i \quad [46]$$

$$0 = \frac{-z + v\sqrt{p^2+q^2}}{\mu} \quad [47]$$

$$0 = kd\bigg(E(z-\lambda) + \frac{A(-z+v\sqrt{p^2+q^2})}{\mu} + \quad [48]$$
$$B\bigg(\frac{v(w-G(z-\lambda))(qr_i + r_r p)}{\mu\sqrt{p^2+q^2}} +$$
$$\frac{-v\sqrt{p^2+q^2} - \sqrt{p^2+q^2}\,v\mu\delta + z}{\mu^2}\bigg)\bigg)$$

Letting the equilibrium point be denoted by $p_e$, $q_e$, $z_e$, and $\phi_e$, expressions 37 and 44 lead to $$z_e = \lambda$$

It can be seen from expression 30 that x=0 at the equilibrium point. For an arbitrary positive ω which is enough to generate the output voltage $z_e$, there exists such the equilibrium point that frequency $\phi_e$ generates output voltage $z_e$ with amplitude ω. Let r be denoted by $$r = \sqrt{\phi_e^2 + \delta^2}$$

then $p_e$, $q_e$, $z_e$ and λ are given as functions of $\phi_e$ by $$p_e = \frac{w(\delta r_r + r_i \phi_e)}{\phi_e^2 + \delta^2} \quad [51]$$

$$q_e = -\frac{w(-\delta r_i + \phi_e r_r)}{\phi_e^2 + \delta^2} \quad [52]$$

$$z_e = \frac{vwr}{\sqrt{\phi_e^2 + \delta^2}} \quad [53]$$

$$\lambda = \frac{vwr}{\sqrt{\phi_e^2 + \delta^2}} \quad [54]$$

Stability of Differential Equation System

Stability of the differential equation system is analyzed by the Lyapunov method in the neighborhood of the equilibrium point. For the purpose, p, q, z and φ are expanded in the neighborhood of $p_e$, $q_e$, $z_e$ and $\phi_e$ as follows.

$$p = p_e + \Delta p$$

$$q = q_e + \Delta q$$

$$z = z_e + \Delta z$$

$$\phi = \phi_e + \Delta \phi$$

Substituting the above equations for expressions 39~42 and ignoring the higher order terms of the expansion give the following regular system of the differential equations relative to Δp, Δq, Δz and Δφ.

(1)

$$\frac{d}{dt}\begin{bmatrix}\Delta p\\ \Delta q\\ \Delta z\\ \Delta \phi\end{bmatrix} = M \begin{bmatrix}\Delta p\\ \Delta q\\ \Delta z\\ \Delta \phi\end{bmatrix} \quad [59]$$

(2)

$$M = \begin{bmatrix} -\delta & \phi_e & -Gr_r & q_e \\ -\phi_e & -\delta & -Gr_i & -p_e \\ \dfrac{vp_e}{\sqrt{p_e^2+q_e^2}\,\mu} & \dfrac{vq_e}{\sqrt{p_e^2+q_e^2}\,\mu} & -\mu^{-1} & 0 \\ M_{41} & M_{42} & M_{43} & 0 \end{bmatrix} \quad [60]$$

where $$M_{41} = \frac{kdv}{\mu^2(p_e^2+q_e^2)^{3/2}}(q_e B\mu(w - z_e G + \lambda G)(-r_i p_e + q_e r_r) - \quad [61]$$
$$p_e(p_e^2+q_e^2)(-A\mu + B + B\mu\delta))$$

$$M_{42} = \frac{kdv}{\mu^2(p_e^2+q_e^2)^{3/2}}(-p_e B\mu(w - zG + \lambda G)(-r_i p_e + q_e r_r) - \quad [62]$$
$$q_e(p_e^2+q_e^2)(-A\mu + B + B\mu\delta))$$

$$M_{43} = kd\bigg(E - \frac{A}{\mu} - \frac{B\big(-\sqrt{p_e^2+q_e^2} + v\mu p_e r_r G + v\mu q_e r_i G\big)}{\mu^2 \sqrt{p_e^2+q_e^2}}\bigg) \quad [63]$$

Elements of matrix M are functions of $p_e$, $q_e$, $z_e$ and $\phi_e$. Together with expressions 51~54, the elements are thought to be functions of $\phi_e$. Then let the characteristic polynomial of M be m(h) and m(h) be represented by $$m(h) = a_0 h^4 + a_1 h^3 + a_2 h^2 + a_3 h + a_4$$

then coefficients $a_0$, $a_1$, $a_2$, $a_3$ and $a_4$ are given as functions of $\phi_e$ in the following.

$$a_0 = 1 \qquad [65]$$

$$a_1 = \frac{2\mu\delta + 1}{\mu} \qquad [66]$$

$$a_2 = \frac{\phi_e kdv\, Bwr + vG\delta r + 2\delta\sqrt{\phi_e^2 + \delta^2} + (\phi_e^2 + \delta^2)^{3/2}\mu}{\sqrt{\phi_e^2 + \delta^2}\,\mu} \qquad [67]$$

$$a_3 = \frac{\phi_e kdv\, wAr + (\phi_e^2 + \delta^2)^{3/2} + vGr(\phi_e^2 + \delta^2)}{\sqrt{\phi_e^2 + \delta^2}\,\mu} \qquad [68]$$

$$a_4 = \frac{\phi_e kdv\, wEr}{\sqrt{\phi_e^2 + \delta^2}\,\mu} \qquad [69]$$

where $r$ is defined as $$r = \sqrt{r_r^2 + r_i^2}$$

Let feeding back the output voltage to the amplitude be given, not by expression 30 but by $$x = -G(z - \lambda) - H\frac{dz}{dt} \qquad [71]$$

then coefficients $a_0$, $a_1$, $a_2$, $a_3$ and $a_4$ are as follows.

$$a_0 = 1 \qquad [72]$$

$$a_1 = \frac{\delta vHr + 2\delta\mu\sqrt{\phi_e^2 + \delta^2} + \sqrt{\phi_e^2 + \delta^2}}{\sqrt{\phi_e^2 + \delta^2}\,\mu} \qquad [73]$$

$$a_2 = \frac{\phi_e kdv\, wrB + \mu(\phi_e^2 + \delta^2)^{3/2} + rHv(\phi_e^2 + \delta^2)\,2\delta\sqrt{\phi_e^2 + \delta^2} + \delta vrG +}{\sqrt{\phi_e^2 + \delta^2}\,\mu} \qquad [74]$$

$$a_3 = \frac{\phi_e wrkdvA + (\phi_e^2 + \delta^2)^{3/2} + vrG(\phi_e^2 + \delta^2)}{\sqrt{\phi_e^2 + \delta^2}\,\mu} \qquad [75]$$

$$a_4 = \frac{\phi_e kdv\, wrE}{\sqrt{\phi_e^2 + \delta^2}\,\mu} \qquad [76]$$

Characteristic polynomial $m(h)$ is a function of $h$ and $\phi_e$ where $\phi$ can be substituted without confusion for $\phi_e$ in the expression of the characteristic polynomials.

Characteristic Polynomial For Fixed Carrier Frequency

In the case that the frequency of the carrier is fixed and that the output voltage is not fed back to the frequency of the carrier, the output voltage is stabilized by feeding back the output voltage to the amplitude of the carrier. Let the output voltage be fed back to the amplitude of the carrier by $$x = -G(z - \lambda)$$

where $G$ is a positive constant, the simplest differential equation system describing the power supply will be $$\frac{d}{dt}p = \phi q - \delta p + (w - G(z - \lambda))r_r \qquad [78]$$

$$\frac{d}{dt}q = -\phi p - \delta q + (w - G(z - \lambda))r_i \qquad [79]$$

$$\frac{d}{dt}z = \frac{-z + v\sqrt{p^2 + q^2}}{\mu} \qquad [80]$$

In expressions 78~80, $\phi$ is fixed. Then $p_e$, $q_e$ and $z_e$ are expressed by the fixed $\phi$ and $\lambda$ prescribed beforehand with $$r = \sqrt{\phi^2 + \delta^2} \qquad [81]$$

as $$p_e = \frac{\delta r_r w + \phi r_i w + \phi r_i G\lambda + \delta r_r G\lambda}{\sqrt{\phi^2 + \delta^2}\left(\sqrt{\phi^2 + \delta^2} + vGr\right)} \qquad [82]$$

$$q_e = \frac{\delta r_i w + \delta r_i G\lambda - r_r w\phi - r_r G\phi\lambda}{\sqrt{\phi^2 + \delta^2}\left(\sqrt{\phi^2 + \delta^2} + vGr\right)} \qquad [83]$$

$$z_e = \frac{vr(w + \lambda G)}{\sqrt{\phi^2 + \delta^2} + vGr} \qquad [84]$$

Let $m(h)$ be the characteristic polynomial of the differential equation system derived from 78~80 and describing deviation from the equilibrium point and $m(h)$ be represented by $$m(h) = a_0 h^3 + a_1 h^2 + a_2 h^1 + a_3 \text{ coefficients } a_0, a_1, a_2 \text{ and } a_3 \text{ are given by}$$

$$a_0 = 1 \qquad [86]$$

$$a_1 = \frac{1 + 2\delta\mu}{\mu} \qquad [87]$$

$$a_2 = \frac{r\delta vG + \mu(\phi^2 + \delta^2)^{3/2} + 2\delta\sqrt{\phi^2 + \delta^2}}{\sqrt{\phi^2 + \delta^2}\,\mu} \qquad [88]$$

$$a_3 = \frac{\sqrt{\phi^2 + \delta^2}\left(\sqrt{\phi^2 + \delta^2} + Gvr\right)}{\mu} \qquad [89]$$

Characteristic polynomial $m(h)$ is resolved as $$m(h) = \frac{(h^2 + \phi^2 + \delta^2 + 2h\delta)(h\mu + 1)}{\mu} + \frac{vr(h\delta + \phi^2 + \delta^2)G}{\sqrt{\phi^2 + \delta^2}\,\mu} \qquad [90]$$

Voltage difference between the output voltage $z$ and the reference voltage $\lambda$ is fed back to the amplitude of the carrier. Let contribution to the output voltage made by feeding $v$ back to the amplitude be represented by $$gv$$

then the output voltage is given by $$z = gv$$

In the other hand, at the subtraction circuit, $$v = \lambda - z$$

then $$z = \frac{g\lambda}{1+g}. \quad [94]$$

Therefore $$0 = 1+g$$

and the following characteristic polynomial $$0 = m(h)$$

are equivalent conditions for stability, and expression 95 and 96 are equivalent. Then $$g = \frac{vGr(h\delta + \phi^2 + \delta^2)}{\sqrt{\phi^2 + \delta^2}\,(h^2 + \phi^2 + \delta^2 + 2h\delta)(h\mu + 1)} \quad [97]$$

In the case that the feedback to the amplitude is given, not by expression 77 but by the following expression $$x = -G(z - \lambda) - H\frac{d}{dt}z \quad [98]$$

where G and H are positive constants. Let $m_B(h)$ be the characteristic polynomial m(h) corresponding to expression 90, $m_B(h)$ is given by $$m_B(h) = \frac{(2h\delta + h^2 + \delta^2 + \phi^2)(h\mu + 1)}{\mu} + \frac{vr(h\delta + \phi^2 + \delta^2)(hH + G)}{\sqrt{\phi^2 + \delta^2}\,\mu} \quad [99]$$

and expression 97 is rewritten to $$g = \frac{vr(h\delta + \phi^2 + \delta^2)(hH + G)}{\sqrt{\phi^2 + \delta^2}\,(2h\delta + h^2 + \phi^2 + \delta^2)(h\mu + 1)} \quad [100]$$

correspondingly.

Resolution of Characteristic Polynomial m(h)

Polynomial m(h), which is the characteristic polynomial with the coefficients given in expressions 65~69, is represented by $$m(h) = \frac{h(\phi^2 + h^2 + 2h\delta + \delta^2)(\mu h + 1)}{\mu} + \frac{w\phi k(E + hA + h^2 B)vrd}{\sqrt{\phi^2 + \delta^2}\,\mu} + \frac{vrhG(\phi^2 + h\delta + \delta^2)}{\sqrt{\phi^2 + \delta^2}\,\mu} \quad [101]$$

The second term on the right hand side in expression 101 coincides with the numerator of the transfer function for the feedback. Therefore, the second term originates in the feedback circuit. The first and the third terms independent of the feedback stem from the voltage generation circuit. As for the first term, h corresponds to the pole located at the origin created by the feedback circuit and (μh+1) to the rectification circuit whose time constant is 1/μ.

The subtraction circuit in the error amplifier outputs voltage difference ν between output voltage z and the reference voltage. Voltage difference ν is fed back to the frequency and the amplitude of the carrier. Let the contribution of the output voltage made by feeding ν back to the frequency be represented by $$f\nu$$

and the contribution of the output voltage made by feeding ν back to the amplitude be expressed by $$g\nu$$

then the output voltage z is given by $$z = f\nu + g\nu$$

In the other hand, at the subtraction circuit, $$\nu = \lambda - z$$

then z is represented by $$z = \frac{(f+g)\lambda}{1+f+g} \quad [106]$$

The following equations $$0 = 1+f+g$$

and $$0 = m(h)$$

are equivalent where m(h) is the characteristic polynomial. Hence, f and g are given except for a common multiplier by $$f = \frac{k\phi w(E + Ah + Bh^2)vrd}{\sqrt{\phi^2 + \delta^2}\,h(\phi^2 + h^2 + \delta^2 + 2h\delta)(1 + h\mu)} \quad [109]$$

$$g = \frac{Gvr(\phi^2 + h\delta + \delta^2)}{\sqrt{\phi^2 + \delta^2}\,(\phi^2 + h^2 + \delta^2 + 2h\delta)(1 + h\mu)} \quad [110]$$

The characteristic polynomial m(h) with coefficients $a_0$, $a_1$, $a_2$, $a_3$ and $a_4$ given in expressions 72~76 is represented by $$m(h) = \frac{h(\delta^2 + 2h\delta + h^2 + \phi^2)(h\mu + 1)}{\mu} + \frac{\phi wk(E + hA + h^2 B)vrd}{\sqrt{\phi^2 + \delta^2}\,\mu} + \frac{hvr(\delta^2 + h\delta + \phi^2)(G + hH)}{\sqrt{\phi^2 + \delta^2}\,\mu} \quad [111]$$

For the above mentioned m(h), f in expression 109 and g in expression 110 are given as $$f = \frac{k\phi w(E + Ah + Bh^2)vrd}{\sqrt{\phi^2 + \delta^2}\,h(\phi^2 + h^2 + \delta^2 + 2h\delta)(1 + h\mu)} \quad [112]$$

$$g = \frac{vr(\phi^2 + h\delta + \delta^2)(G + hH)}{\sqrt{\phi^2 + \delta^2}\,(\phi^2 + h^2 + \delta^2 + 2h\delta)(1 + h\mu)} \quad [113]$$

As for f, let a real root of the second order equation $$E + Ah + Bh^2 = 0$$

in the numerator cancel 1+μh in the denominator, then the numerator of f is of the first degree in h and the denominator is of the third degree in h where one of the pole is located at the origin.

As for g, let G+Hh in the numerator cancel 1+μh in the denominator, then the numerator of g is of the first degree in h, and the denominator is of the second degree in h.

Transfer Function From Amplitude to Output Voltage

Let the output voltage be fed back to the amplitude by $$x = -G(z-\lambda)$$

for a positive constant G, then g is given by expression 110, while by $$x = -D(z-\lambda) - H\frac{d}{dt}z \qquad [116]$$

for positive constants G and H, then g is given by $$g = \frac{vr(\phi^2 + \delta^2 + h\delta)(Hh+G)}{\sqrt{\phi^2+\delta^2}(\phi^2+\delta^2+h^2+2h\delta)(h\mu+1)} \qquad [117]$$

From expressions 110 and 117, the transfer function from the amplitude to the output voltage is found to be $$\frac{vr(\phi^2+\delta^2+h\delta)}{\sqrt{\phi^2+\delta^2}(\phi^2+\delta^2+h^2+2h\delta)(h\mu+1)} \qquad [118]$$

Since the transfer function includes the first order delay $$\frac{1}{\mu h + 1} \qquad [119]$$

due to the rectification circuit, The voltage difference z−λ transformed so as to cancel the delay $$\mu h + 1,$$

before applying the amplitude, can be fed back to the amplitude faster.

Compensated Transfer Function From Voltage Difference to Output Voltage

In the case that the rectification circuit works without delay, the change of the voltage difference is equal to the input to the transfer function from the amplitude to the output voltage given as $$\frac{vr(\phi^2+h\delta+\delta^2)}{\sqrt{\phi^2+\delta^2}(\phi^2+2h\delta+\delta^2+h^2)} \qquad [121]$$

Then the dc gain at h=0 is expressed as $$\frac{vr}{\sqrt{\phi^2+\delta^2}}. \qquad [122]$$

Namely, letting ω be the amplitude of the carrier, the output voltage is $$\frac{vrw}{\sqrt{\phi^2+\delta^2}}, \qquad [123]$$

coinciding with expression 54.

Expression 121 shows the delay that the change of the amplitude comes out to the output voltage when rectification causes no delay.

Schematic Diagram for Model of Feedback

Let the voltage difference between the output voltage and the reference voltage, λ−z, be supplied to the circuits A and B as shown in FIG. 2, and the output voltage z be the sum of the output of the individual circuits as $$A(\lambda\mathbf{31}\,z)+B(\lambda-z)$$

where the transfer functions of circuit A and B are denoted by A and B respectively.

Then z is given by $$z = \frac{\lambda(A+B)}{1+A+B} \qquad [125]$$

The stability of the feedback is attributed to the roots of the following equation:

$$1+A+B=0.$$

For simplicity, let the transfer function A be $$A = \frac{a}{s} \qquad [127]$$

with the pole at the origin, and B be the simplest model of an amplifier such as $$B = \frac{c}{s+b} \qquad [128]$$

then expression 126 is rewritten to $$s^2+s(a+b+c)+ab=0.$$

Necessary and sufficient conditions that the expression 129 has real negative roots is $$\frac{(a+b+c)^2}{4} - ab \geq 0 \qquad [130]$$

and expression 130 holds for arbitrary positive a, b and c.

Let roots of expression 129 be α and β, where α is closest to the origin. Expression 129 is rewritten as $$s^2+s(b+c)=-a(s+b)$$

Then as −a grows in magnitude, −α and −β become large, and it can be seen that $$(b+c)^2-(b+c)(a+b+c)+ab<0,$$

therefore $$\beta<-(b+c)$$

The loop including circuit A feeds the output voltage back to the frequency of the carrier, and the loop including circuit B feeds the output voltage back to the amplitude of the carrier. Since circuit B is wider than circuit A in bandwidth, and the output voltage is mainly fed back to the amplitude. The transfer function of circuit B is not provided with the pole at the origin, and then there is the standard deviation between the output of circuit B and the reference voltage. The standard deviation is removed by the output of circuit A.

Transfer Function Compensating Delay of Rectification Circuit

Let $\mu_1$ be such that $$\mu_1 \approx \mu$$

and the output voltage is fed back to the amplitude of the carrier by $$x = -G(z - \lambda) - \mu_1 G \frac{d}{dt} z \quad [135]$$

where G is a positive constant. Then g is given by $$g = \frac{vr(\phi^2 + \delta^2 + h\delta)G(\mu_1 h + 1)}{\sqrt{\phi^2 + \delta^2}\,(\phi^2 + \delta^2 + h^2 + 2h\delta)(h\mu + 1)}. \quad [136]$$

Similarly f is written by $$f = \frac{k\phi w(E + Ah + Bh^2)vrd}{\sqrt{\phi^2 + \delta^2}\,h(\phi^2 + h^2 + \delta^2 + 2h\delta)(1 + h\mu)}. \quad [137]$$

As for $E+Ah+Bh^2$ in the numerator of f, it is expected that one of the real roots of the following equation $$E + Ah + Bh^2 = 0$$

cancels $1+\mu h$ in the denominator. Namely expression 138 has a real root in the neighborhood of $-1/\mu$.

Roots of Equation m(h)=0

In order to examine the roots of equation m(h)=0 derived from the characteristic polynomial, let $f_1(h)$ and $f_2(h)$ be defined as $$f_1(h) = \quad [139]$$
$$\frac{h(\phi^2 + h^2 + 2h\delta + \delta^2)(h\mu + 1)}{\mu} + \frac{kw\phi(\phi^2 + h\delta + \delta^2)(G + hH)}{\sqrt{\phi^2 + \delta^2}\,\mu}$$

$$f_2(h) = -\frac{kw\phi(hA + h^2 B + E)vrd}{\sqrt{\phi^2 + \delta^2}\,\mu} \quad [140]$$

Then $$m(h) = f_1(h) - f_2(h) \quad [141]$$

Let m(h) be represented by $$m(h) = a_0 h^4 + a_1 h^3 + a_2 h^2 + a_3 h + a_4,$$

then coefficients $a_0$ and $a_1$ are $$a_0 = 1 \quad [143]$$

and $$a_1 = \frac{\delta v G \mu_1 r}{\sqrt{\phi^2 + \delta^2}\,\mu} + \frac{2\delta\mu + 1}{\mu} \quad [144]$$

So $\mu_1$ is approximate to $\mu$, and $$\frac{vwr}{\sqrt{\phi_e^2 + \delta^2}} \quad [145]$$

is equal to the reference voltage $\lambda$ from expression 54 and to the output voltage, letting G be selected so as to satisfy $$\frac{G}{w} \gg 1, \quad [146]$$

then, letting the sum of the root of m(h)=0 be S, S is evaluated as $$-S = a_1 \geq 2\delta + \frac{1}{\mu} \quad [147]$$

Polynomial $f_1(h)$ is the characteristic polynomial where the output voltage is fed back to the frequency of the carrier. Letting a be the root of $f_1(h)=0$ between 0 and $-1/\mu$, and $\beta$ be the root next to $\alpha$, the feedback is stabilized, for example in the case G=0, by such arrangement of the roots as $$-\frac{1}{2\delta} < \beta < -\frac{1}{\mu} < \alpha < 0 \quad [148]$$

where $\alpha$ and $\beta$ are roughly given by the term $E+As+Bs^2$ as $$\alpha \sim -\frac{E}{A} \quad [149]$$

$$\beta > -\frac{A}{2B} \quad [150]$$

Then the following inequality holds at h in the interval between $\alpha$ and $\beta$.

$$f_1(h) < 0$$

Graph $y=f_2(h)$ crosses the h axis at the origin, $-G/H$ and $-(\delta^2+\phi^2)/S$. Graphs $y=f_1(h)$ and $y=f_2(h)$ are shown in FIG. 3. Root $\alpha$ locates closer to the origin than both of $-G/H$ and $-(\delta^2+\phi^2)/\delta$, it can be seen that there exists $h_0$ between $\alpha$ and $\beta$ such that $$f_1(h_0) \leq f_2(h_0)$$

Then graphs $y=f_1(h)$ and $y=f_2(h)$ crosses at least once at each side of $h_0$, namely in the interval between the origin and $h_0$, and in the interval between $h_0$ and $-\infty$. If G and H are zero, then $m(h)=f_1(h)$ and the roots of $m(h)=0$ coincide with the ones of $f_1(h)=0$. As G increases in a positive direction, then S increases in the absolute value, which can move $\beta$ in a negative direction keeping the real parts of the roots negative.

In the case that the equation $f_1(h)=f_2(h)$ has four real roots, then all the roots are negative. In the case that the equation $f_1(h)=f_2(h)$ has two complex roots and two real roots. Let the real root closest to the origin be α' and the real root next to α' be β'. The real part of the complex roots influences the stability of feedback. The location of β' is related with the position of the real part of the complex roots. For example, in the case such as $$-S \sim 8\delta,$$

letting β' be in the neighborhood of −2δ, the real part of the complex roots is estimated to be in the neighborhood of −3δ, where α' in the neighborhood of the origin is ignored. Then the roots of m(h)=0 line up in the sequence of the origin, α', β' and the real part on the h axis. Letting β' move beyond −4δ transfers the real part in the positive h axis, causing instability.

In the case that the output voltage is not fed back to the amplitude, β the root of $f_1(h)=0$, located close to −2δ brings the real part of the complex root in the neighborhood of the origin, and causes the ringing of the output voltage. The feedback to the amplitude S and attenuates the ringing.

The resonance frequency of the resonance circuit depends on the load. A range of load is limited in the case that the frequency of the carrier is fixed and that the feedback of the output voltage to the frequency of the carrier is not effective, which is described by the differential equation system defined by expressions 78~80. The feedback of the output voltage to the frequency of the carrier removes the restrictions on load caused by the fixed frequency.

Advantageous Effect of Invention

Feeding the output voltage back to both the amplitude and the frequency of the carrier driving a resonance circuit improves the characteristics of the power supply using the resonance circuit, making the characteristics approximate to the ones of the power supply using the conventional transformer.

BEST MODE FOR CARRYING OUT THE INVENTION

A block diagram of a stabilized dc Voltage power supply, using a piezoelectric transformer as a resonance circuit and composed of a voltage generation and a feedback circuits, is shown as implementation of the invention. A circuit simulating the voltage power supply denoted in the block diagram is given, showing the feedback to be stable.

[Mode for Invention 1]

Figure 1:
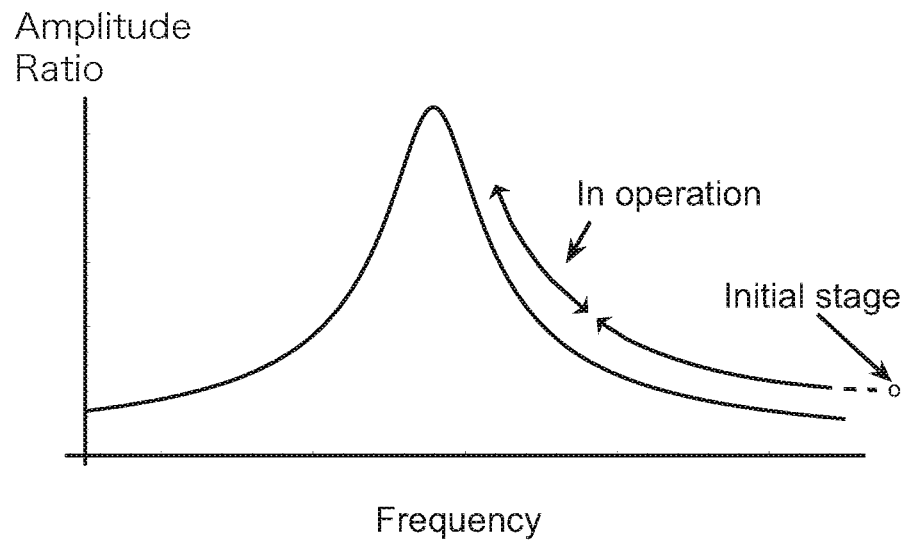
FIG. 1 is an explanation chart where resonance frequency and the range of the driving frequency are shown.
Figure 2:
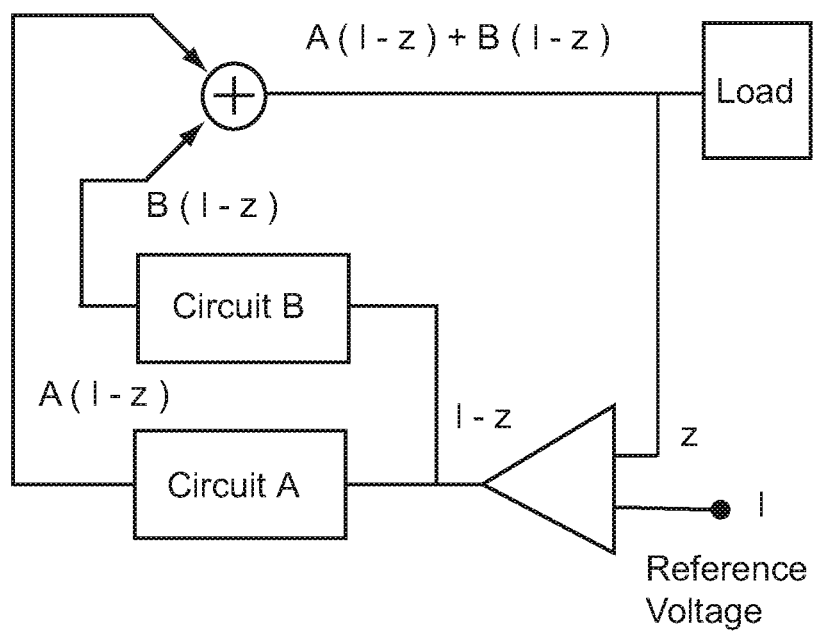
FIG. 2 is an explanation chart where a block diagram for a model of feedback is shown.
Figure 3:
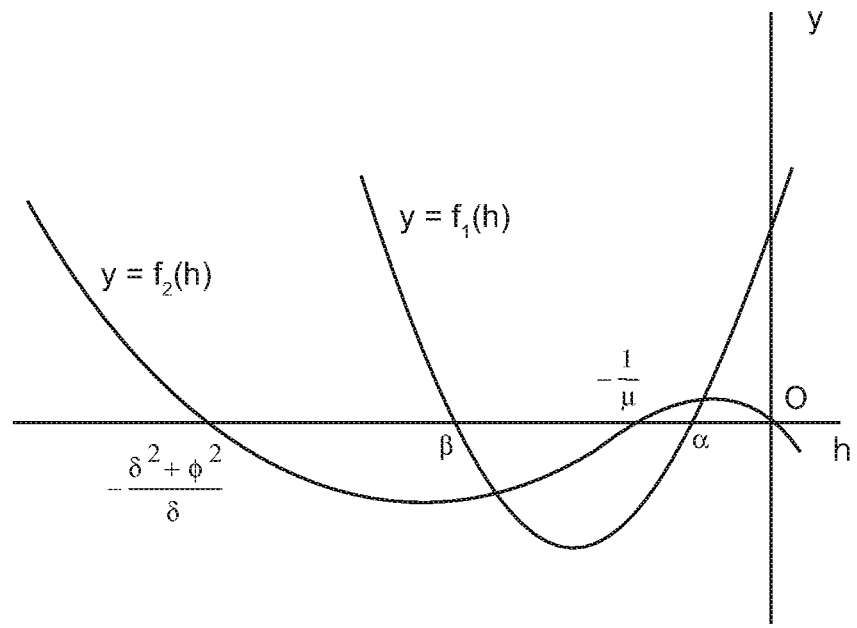
FIG. 3 is an explanation chart where roots of equation $m_A(h)=0$ are shown.
Figure 4:
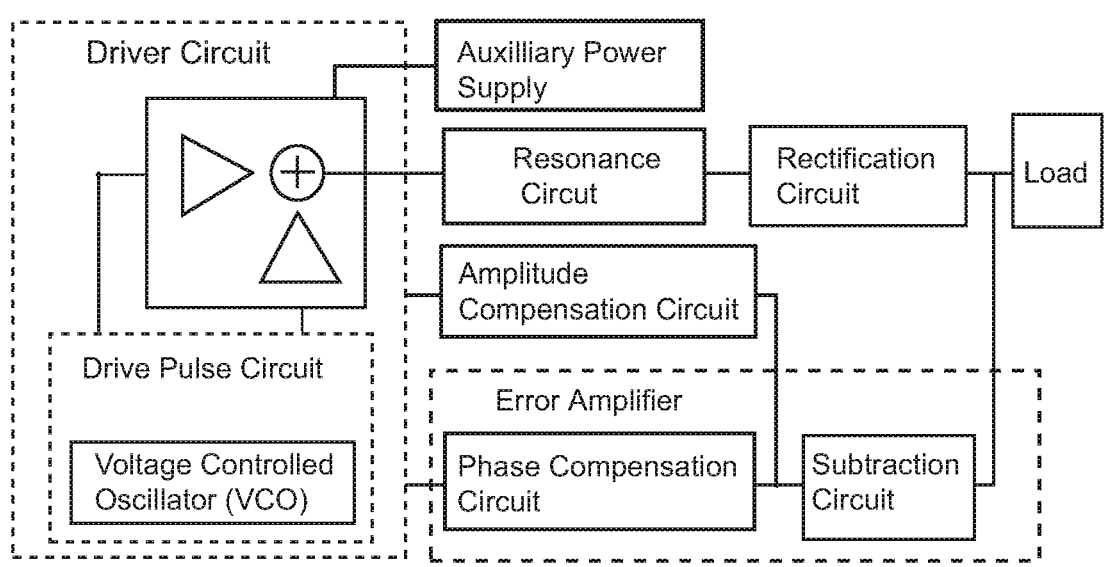
FIG. 4 is an explanation chart where a block diagram of the power supply is shown.

The block diagram of the stabilized dc voltage power supply is denoted in FIG. 4, where the driver circuit, the piezoelectric transformer and the rectification circuit compose the voltage generation circuit, and the feedback circuit consists of an error amplifier, a voltage controlled oscillator (VCO) and an amplitude compensation circuit.

Piezoelectric Transformer

The piezoelectric transformer utilizes piezoelectricity incorporated in a piezoelectric element. Stress applied to the element causes strain which gets voltage generated, and voltage applied to the element causes stress which gets strain produced. Utilizing the effect, the piezoelectric transformer converts electrical vibration to mechanical one at the primary, and restores the electrical vibration from the mechanical one at the secondary, thus transmitting electric energy from the primary to the secondary. Transformation from the primary to the secondary is attained through conversion between the electric energy and the mechanical energy. The secondary of the transformer is capacitance, and the voltage is generated by the charge injected by the mechanical vibration.

The piezoelectric transformer includes the resonance circuit. Therefore, the piezoelectric transformer shows sharp frequency characteristic and large load dependency, being different from the usual electromagnetic transformer. The piezoelectric transformer is used in the voltage generation circuit. Let amplitude ratio of the piezoelectric transformer be defined by the ratio of the input to the output in voltage where the piezoelectric transformer is connected to the load resistance, the amplitude ratio shows resonance characteristics as a function of the frequency of the carrier.

Rectification Circuit

The output of the piezoelectric transformer is the carrier modulated in amplitude and rectified by a diode bridge. The output of the diode bridge is buffered by a capacitance. The capacitance reduces the voltage ripples in the output voltage. While the output voltage is positive, the rectification circuit can raise the output voltage by pumping up the charge into the capacitance, but cannot lower the output voltage by pumping the charge out of the capacitance. A portion of the charge stored in the transformer is pumped up in a cycle of the carrier frequency.

Considering the change of the output voltage in the case of the positive output voltage, the rise of the output voltage makes the piezoelectric transformer drive the load and charge up the capacitance. The output voltage is lowered through discharge of the capacitance through the load. Then the time constant for the rise become shorter as the load becomes lighter, and the output voltage falls at the time constant caused by the capacitance and the load.

Error Amplifier

The error amplifier is composed of the subtraction circuit and the phase compensation circuit. The subtraction circuit outputs voltage difference between the output voltage and the reference voltage.

The output of the subtraction circuit is supplied to the phase compensation circuit which is composed of an amplifier and its feedback branch. The transfer function of the phase compensation circuit is provided with a pole located at the origin and two zeros. The transfer function converts the input to the output of the phase compensation circuit. The output is clamped by diodes within in a limited range of voltage.

Amplitude Compensation Circuit

The output of the subtraction circuit in the error amplifier is supplied to the amplitude compensation circuit. The amplitude compensation circuit cancels the delay caused by the rectification circuit. The output is supplied to a drive pulse circuit.

Driver Circuit

Being viewed from the input, the piezoelectric transformer looks capacitive. The sinusoidal carrier is indispensable to drive the capacitance efficiently, and the approximate sinusoidal carrier is generated by resonating with inductance.

The driver circuit driving the piezoelectric transformer is composed of a full bridge including a pair of half bridges. The half bridge comprises two FETs and a circuit to drive the FETs. Two FETs in the half bridge are driven by a pair of complementary drive pulses. Two half bridges composing the driver circuit are driven by four drive pulses of the same frequency, which are grouped into two pairs of the complementary drive pulses.

The full bridge in the driver circuit is operated in a phase-shift mode. Four FETs composing the full bridges are driven by two pairs of the complementary drive pulses. There is the phase shift between the pairs. The amplitude of the carrier is controlled by the phase shift between the pairs. The frequency of the drive pulses are generated by the VCO, and the phase shift is controlled by the amplitude compensation circuit. A drive pulse circuit generates the complementary drive pulses.

Drive Pulse Circuit

The output of the phase compensation circuit and the output of the amplitude compensation circuit are both supplied to the drive pulse circuit. The drive pulse circuit includes the VCO, to which the output of the phase compensation circuit is supplied. The VCO produces a pulse sequence whose frequency is proportional to the supplied voltage. On generating two pairs of the drive pulses, the amplitude compensation circuit controls the phase shift between the pairs.

Auxiliary Power Supply

The auxiliary power supply provides a dc voltage to the driver circuit generating the carrier to drive the resonance circuit.

Circuit Simulating Power Supply

Figure 5:
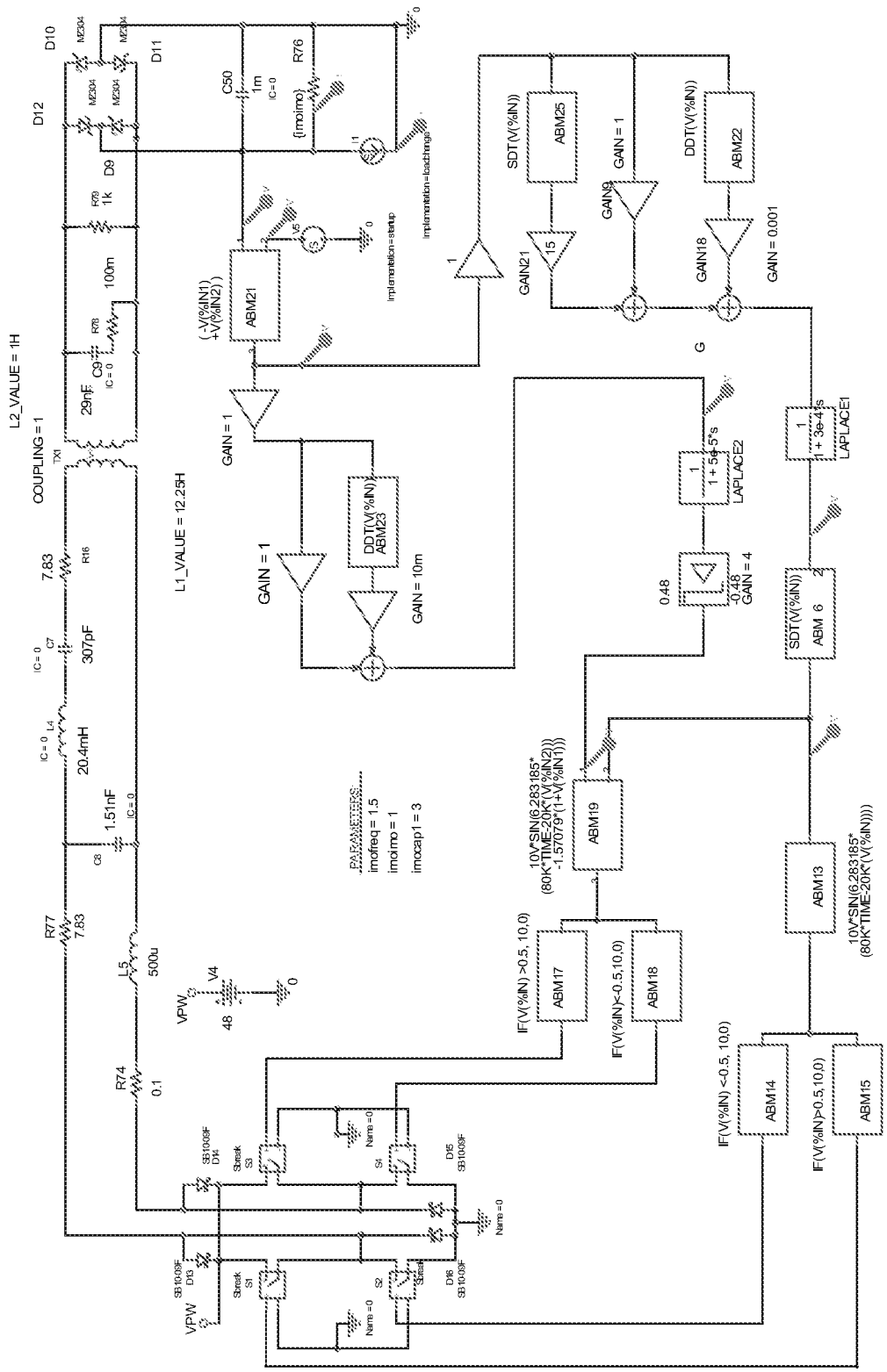
FIG. 5 is an explanation chart where the circuit for simulation is shown.

FIG. 5 shows the circuit simulating the stabilized dc voltage power supply, where the feedback is shown to be stable by simulation. The circuit simulating the voltage generation circuit is the faithful reproduction of an actual circuit except that the piezoelectric transformer is replaced with an equivalent circuit. Fundamentally the feedback circuit is linearly related between its input and output. So in the circuit for simulation, the feedback circuit is replaced with a simple circuit reproducing the relation between the input and output.

Equivalent Circuit for Piezoelectric Transformer

Figure 6:
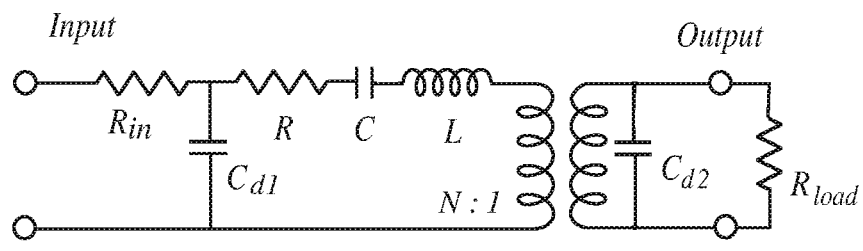
FIG. 6 is an explanation chart where an equivalent circuit of the piezoelectric transformer is shown.
Figure 7:
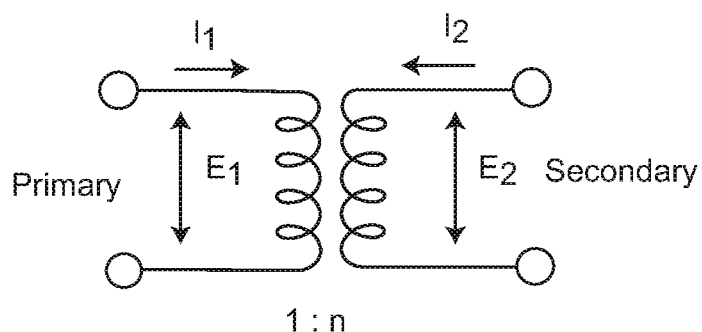
FIG. 7 is an explanation chart where the equivalent circuit of the ideal transformer is shown.

The equivalent circuit of the piezoelectric transformer used in the power supply and its parameters are shown in FIG. 6. The equivalent circuit includes an ideal transformer. Let n be the winding ratio between primary and secondary coils of the ideal transformer shown in FIG. 7. Let the primary voltage and current, and the secondary voltage and current be denoted by $E_1$, $I_1$, $E_9$ and $I_2$ respectively, then $$\frac{E_1}{E_2} = \frac{I_2}{I_1} = n \qquad [154]$$

Frequency Dependence of Piezoelectric Transformer

Figure 8:
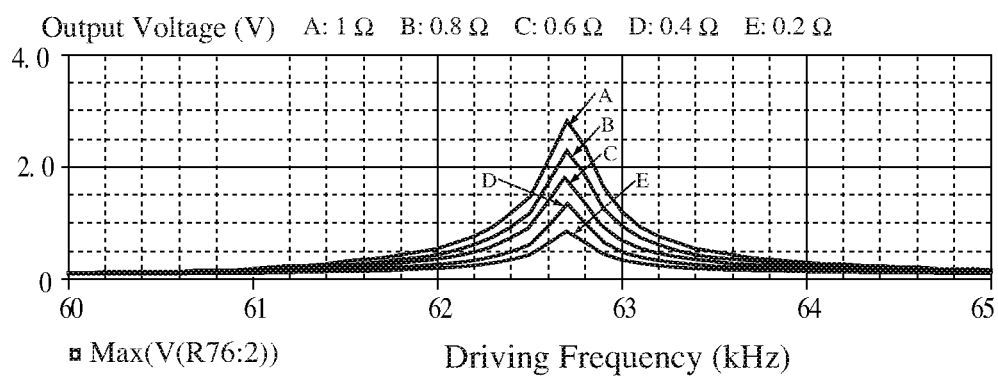
FIG. 8 is an explanation chart where frequency dependence of the piezoelectric transformer is shown.
Figure 9:
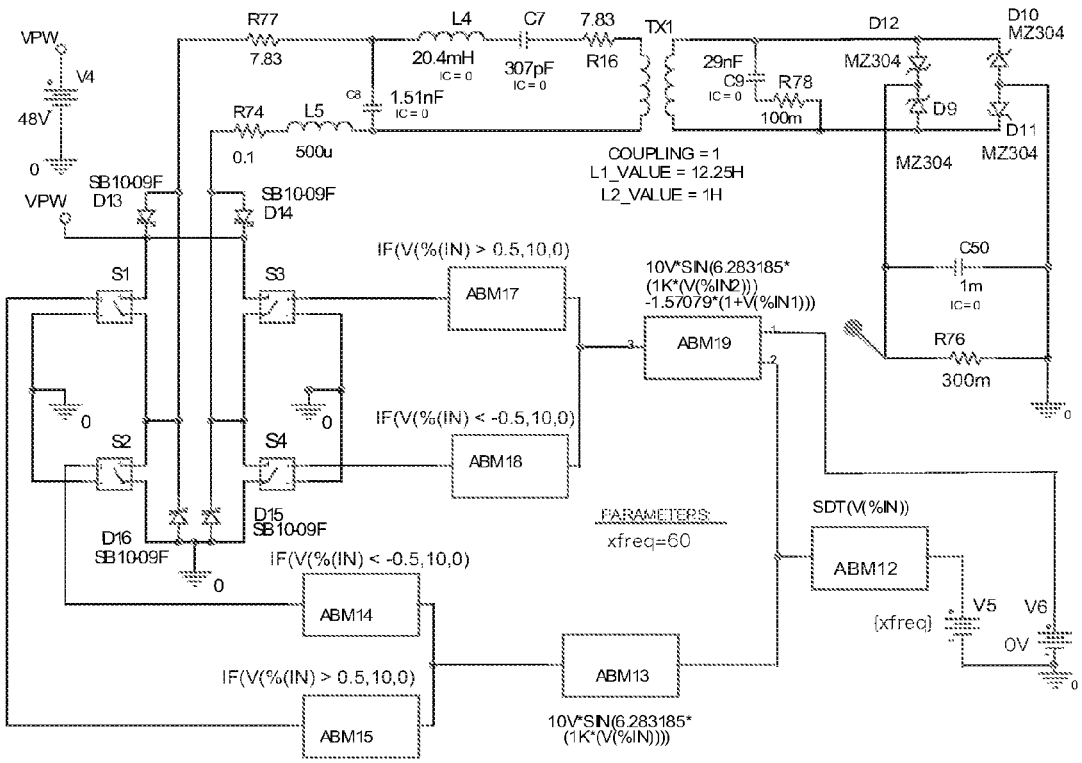
FIG. 9 is an explanation chart where the circuit for simulating the frequency dependence of the piezoelectric transformer is shown.

In FIG. 8, the frequency dependence of the piezoelectric transformer is shown where the load resistance is changed from 1Ω to 200 mΩ with a decrement of 200 mΩ. The circuit simulating the frequency dependence is represented by FIG. 9, where the load resistance is denoted by R76.

Circuit Simulating Error Amplifier

Figure 10:
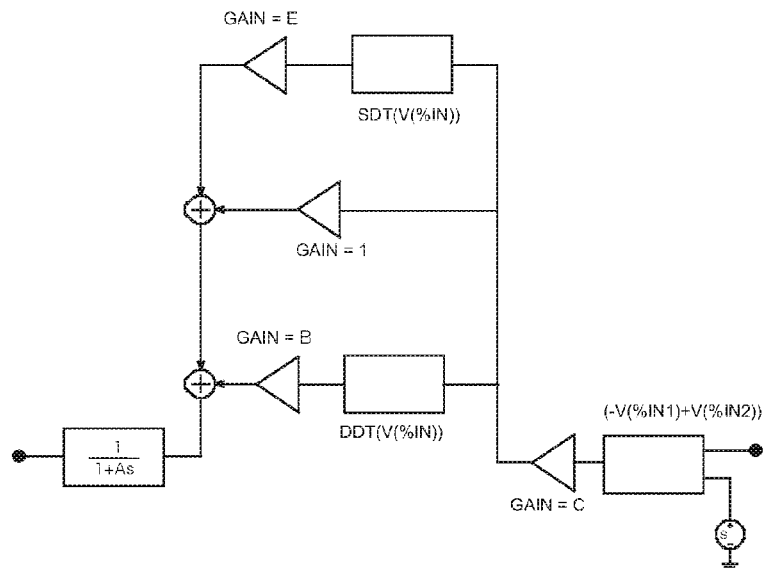
FIG. 10 is an explanation chart where the circuit for simulating the error amplifier is shown.

A circuit element called a behavior model, where the relation between the input and the output is defined by a mathematical expression, is available for simulation. The circuit simulating the error amplifier is shown in FIG. 10. The error amplifier is composed of the subtraction circuit, phase compensation circuit and a first order delay. The subtraction circuit is constructed of the behavior model provided with two input and an output terminals, where the output is equated with voltage difference between the input terminals. The output of the behavior model is amplified by a gain block and supplied to the circuit simulating the phase compensation circuit.

The circuit simulating the phase compensation circuit is composed of an integral part, a proportional part, a differential part, and two adders. The proportional part is composed of a gain block of unity gain. The integral part consists of a gain block and a behavior model. The behavior model provided with function SDT(X) outputs the integration of the input. The output is amplified by the gain block. The output of the gain block is the output of the integration part.

The differential part is composed of a gain block and a behavior model. The behavior model provided with function DDT(x) outputs the differentiation of the input relative to time. The output of the behavior model is amplified by the gain block. The output of the gain block is the output of the differential part.

Let E be the gain of the integration part and B be the one of the differential part, then the transfer function of the error amplifier is given by $$\frac{E}{s} + 1 + Bs. \qquad [155]$$

The first order delay is defined by $$\frac{1}{1+As} \qquad [156]$$

where A is the time constant of the delay. A Laplace element generating the delay is available for simulation. The first order delay is implemented by the Laplace element.

In FIG. 5, element S is the voltage source generating the reference voltage. It is possible to control the loop gain by C. In the figure, E=15, B=0.0001 and C=1.

Circuit Simulating Amplitude Compensation Circuit

Figure 11:
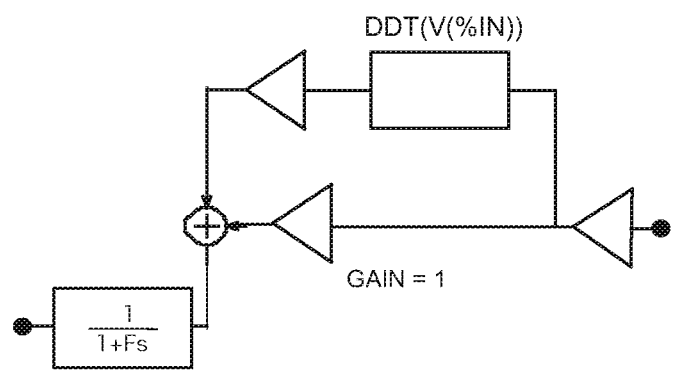
FIG. 11 is an explanation chart where the circuit for simulating the feedback of the amplitude is shown.

The circuit simulating the amplitude compensation circuit is shown in FIG. 11. The circuit for compensation is composed of the circuit compensating the first order delay and a low-pass filter. The circuit for the compensation cancels the delay $$\frac{1}{1+\mu s}$$ [157]

caused by the rectification circuit. Then the transfer function of the circuit for the compensation approximates the one given by $1+\mu s.$ The circuit for compensation is composed of a gain block of unity gain, a differentiator and an adder with two input terminals. The low-pass filter attenuates frequency components outside the bandwidth where the feedback is effective. The low-pass filter is the first order delay implemented by the Laplace element.

Circuit Simulating Driver Circuit

Figure 12:
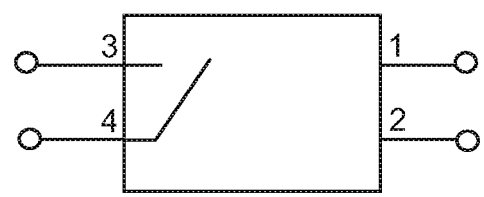
FIG. 12 is an explanation chart where the circuit for simulating a voltage-controlled switch is shown.

The circuit simulating the driver circuit is composed of voltage-controlled switches and the drive pulse circuit. A FET used in actual circuits is simulated by a four-terminal voltage-controlled switch shown in FIG. 12. Terminals 1 and 2 of the switch are the control input, and the voltage difference being higher than 1 V between them makes the switch conduct between terminals 3 and 4. The resistance between the terminals is 0.1Ω while the switch conducts, otherwise the resistance is 1 MΩ.

The driver circuit includes 4 voltage controlled switches A, B, C and D, where A and B compose one half bridge, and C and D compose the other one. Drive pulses a, b, c and d are generated by a drive pulse circuit. The drive pulses a and b are complementary, driving A and B of the half bridge individually. Similarly drive pulses c and d drive C and D individually.

Circuit Simulating Drive Pulse Circuit

Figure 13:
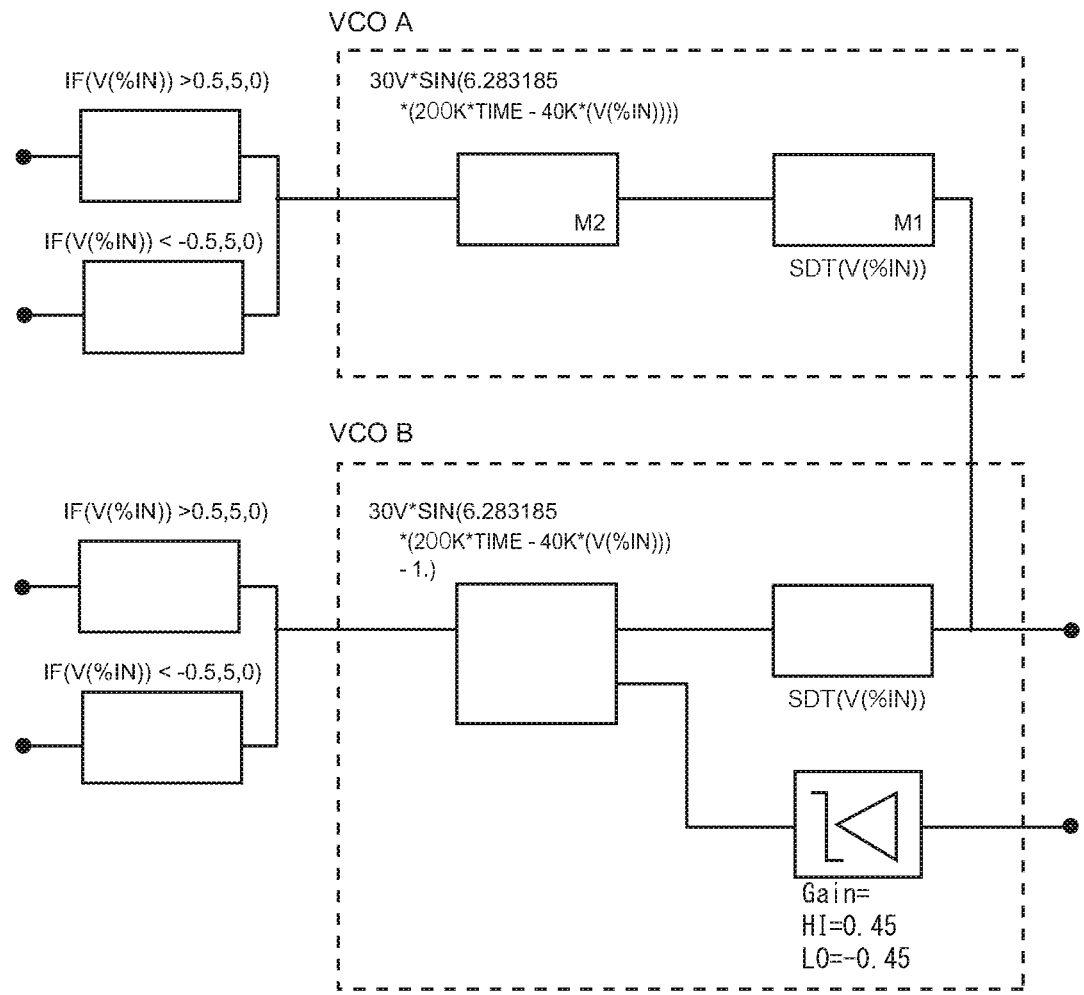
FIG. 13 is an explanation chart where the circuit for simulating a drive pulse circuit is shown.

Circuit simulating the drive pulse circuit is shown in FIG. 13. In order to ease simulation, the circuit for simulation being different from an actual circuit, is constructed on a basis of mathematical relation. The output of a frequency modulation circuit included in the drive pulse circuit is not of a pulse sequences but of sinusoidal wave. The complementary drive pulses provided with dead time are generated by clamping the sinusoidal wave with an appropriate dc voltage level.

The drive pulse circuit includes two frequency modulation circuits A and B. The sinusoidal wave supplied by B is shifted in phase relative to the sinusoidal wave supplied by A. The amount of the phase shift is controlled by the input of the frequency modulation circuit, equivalently the output of the amplitude compensation circuit.

The output of the amplitude compensation circuit shifts the phase of the sinusoidal wave supplied by the circuit B relative to the one of the circuit A between 0 and π.

Circuit Simulating Frequency Modulation Circuit

The circuit simulating the frequency modulation circuit is composed of two behavior models M1 and M2 as shown in FIG. 13. M1 outputs the integration of its input. M2 outputs the sinusoidal wave with the phase specified by its input. As a result, the M2 supplies the sinusoidal wave with the frequency proportional to the input of M1, namely the output of the error amplifier.

Simulation Example of Stable Feedback

Figure 14:
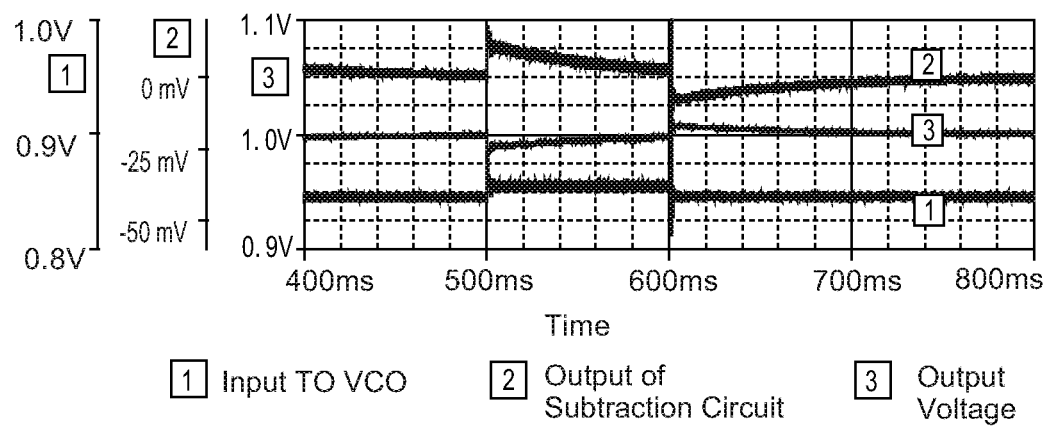
FIG. 14 is an explanation chart where results of simulation are shown.

The circuit for simulation in FIG. 5 is utilized to show that the feedback implemented in the stabilized dc voltage power supply is stable. The rated voltage of the power supply is 1 V. The output voltage together with the input of the frequency modulation circuit and the output of the subtraction circuit are shown in FIG. 14 when the output current is added by 600 mA for 100 msec to the stationary output current of 1 A. In the figure, a horizontal axis shows time, and vertical axes 1, 2 and 3 correspond to the input of the frequency modulation circuit, the output of the subtraction circuit and the output voltage respectively.

The invention claimed is:

1. In a system of differential equations describing operation of
such a power supply including
1. a driver circuit,
2. a resonance circuit,
3. a rectification and smoothing circuit,
4. an error amplifier,
5. a voltage controlled oscilator herafter abbreviated to VCO, and
6. a reference voltage;
wherein
1. the driver circuit generates a carrier which is supplied to the resonance circuit, the carrier being modulated in frequency and fixed in amplitude,
2. the resonance circuit converts the frequency-modulated carrier at the input to an amplitude-modulated carrier at the output,
3. the rectification and smoothing circuit rectifies the amplitude-modulated carrier supplied by the resonance circuit to a direct-current output voltage of the power supply,
4. the error amplifier outputs the voltage difference between the output voltage and the reference voltage to the VCO,
5. the VCO generates the frequency in which the carrier is modulated, the frequency being shifted according to the voltage difference, and
6. the reference voltage is externally supplied to set up the output voltage of the power supply;
consisting of
1. equations $$\frac{d}{dt}p = q\phi - p\delta + r_r w \quad [1]$$

$$\frac{d}{dt}q = -p\phi - q\delta + r_i w \quad [2]$$

derived from a second order differential equation for forced oscillation of the resonance circuit by introducing variables p and q transforming the second order differential equation to a couple of first order differential equations:
(a) δ being a half band width of the forced oscillation,
(b) φ being frequency of the carrier in terms of angular velocity.
(c) ω being a fixed amplitude of the carrier, and
(d) $r_r$ and $r_i$ being coefficients of the amplitude of the carrier;
2. equation $$\mu \frac{d}{dt}z + z = v\sqrt{p^2 + q^2} \quad [3]$$

approximating the output voltage supplied by the rectification and smoothing circuit:
(a) z being the output voltage,
(b) μ being a time constant for smoothing, and
(c) the carrier outputted by the resonance circuit being rectified to a direct-current voltage $v\sqrt{p^2+q^2}$ where v is a multiplier at rectification;

3. equation $$\frac{d}{dt}\phi = kd\left(E(z-\lambda) + A\frac{d}{dt}z + B\frac{d^2}{dt^2}z\right) \quad [4]$$

feeding back the voltage difference and its derivatives to the frequency of the carrier:
(a) the output voltage being divided by d so as to fit an input range of the error amplifier,
(b) the voltage difference supplied to the VCO being d z−n where n is a fixed voltage supplied externally,
(c) k being a conversion coefficient of the VCO,
(d) k(d z−n) being transformed to kd (z−λ) where λ is the reference voltage, and
(e) A, B and E being constants; and 4. the characteristic polynomial $m_F(h)$ for the system of differential equations having equations 1, 2, 3, and 4 defined around an equilibrium point being given by $$m_F(h) = \frac{h(\delta^2 + 2h\delta + \phi_e^2 + h^2)(h\mu + 1)}{\mu} + \frac{kw\phi_e(hA + h^2B + E)vrd}{\sqrt{\phi_e^2 + \delta^2}\,\mu} \quad [5]$$

where
(a) r being defined by $\sqrt{r_r^2+r_i^2}$, and
(b) $\phi_e$ being $\phi$ at the equilibrium point;
extension comprising
1. the amplitude of the carrier being varied with the voltage difference fed back as $$w - G(z-\lambda) - H\frac{dz}{dt}: \quad [6]$$

(a) ω being the amplitude of the carrier without the feedback, and
(b) G and H being constant;

2. equation $$\frac{d}{dt}p = q\phi - p\delta + r_r\left(w - G(z-\lambda) - H\frac{dz}{dt}\right) \quad [7]$$

derived by replacing ω in expression 1 with expression 6;

3. equation $$\frac{d}{dt}q = -p\phi - q\delta + r_i\left(w - G(z-\lambda) - H\frac{dz}{dt}\right) \quad [8]$$

derived by replacing ω in expression 2 with expression 6; and 4. the characteristic polynomial $m_V(h)$ for the system having equations 7, 8, 3, and 4 being given by $$m_V(h) = \frac{h(\delta^2 + 2h\delta + h^2 + \phi_e^2)(h\mu + 1)}{\mu} + \frac{\phi_e wk(E + hA + h^2B)vrd}{\sqrt{\phi_e^2 + \delta^2}\,\mu} + \frac{hvr(\delta^2 + h\delta + \phi_e^2)(G + hH)}{\sqrt{\phi_e^2 + \delta^2}\,\mu}. \quad [9]$$

2. In the system of differential equations in claim 1, expressions comprising
1. the transfer function from the amplitude of the carrier driving the resonance circuit to the direct-current voltage being given by $$\frac{r(\phi_e^2 + \delta^2 + h\delta)}{\sqrt{\phi_e^2 + \delta^2}\,(\phi_e^2 + \delta^2 + h^2 + 2h\delta)} \quad [10]$$

and
2. the transfer function from the frequency of the carrier driving the resonance circuit to the direct-current voltage being given by $$\frac{\phi_e wr}{\sqrt{\phi_e^2 + \delta^2}\,(\phi_e^2 + h^2 + \delta^2 + 2h\delta)} \quad [11]$$

postulating that rectification works without delay.

3. Letting $\phi_e$ be the angular velocity of a given equilibrium point, the characteristic polynomial implemented by mv(h) set with A=0, B=0 and H=0 in expression 9 in claim 1 being equated with $m_F(h)$ in expression 5 in claim 1 with
1. E in $m_V(h)$, and
2. A and B defined as $$A = \frac{G(\delta^2 + \phi_e^2)}{wkd\phi_e}, \text{ and} \quad [12]$$

$$B = \frac{G\delta}{wkd\phi_e}. \quad [13]$$

* * * * *